United States Patent Office 3,128,194
Patented Apr. 7, 1964

3,128,194
ALKALI RESISTANT MULLITE REFRACTORY
Leonard D. Christie, Jr., Old Greenwich, Conn., assignor to The Babcock & Wilcox Company, New York, N.Y., a corporation of New Jersey
No Drawing. Filed Jan. 23, 1959, Ser. No. 788,505
6 Claims. (Cl. 106—67)

This invention relates to high use temperature refractory materials, and more particularly to alkali-resistant, high use temperature refractory shapes.

It is known that mullite, which is a crystalline compound of alumina and silica having the formula $$3Al_2O_3:2SiO_2$$

is an excellent high use temperature refractory, and this fact has resulted in the introduction of many mullite type refractories ranging from those containing only a relatively small amount of mullite to those constituted essentially entirely of mullite crystals. The high temperature properties of these mullite type refractories, particularly as respects deformation and spalling, depend substantially upon the amount, size and arrangement of the mullite crystals. For high resistance to deformation and good spalling resistance at the higher use temperatures, it is desirable to have a high percentage of mullite crystals, and to have the size of such crystals in the refractory as large as possible.

A certain percentage of crystalline mullite is formed when any composition or mixture including alumina and silica is heated above the mullite crystallization temperature, but the maximum amount of mullite crystals is formed when the alumina and silica in the starting mixture are present in the theoretical mullite ratio of 72 percent alumina to 28 percent silica. When the ratio is less than this, the free silica present will result in there being a mixture of mullite crystals and liquid at temperatures between 2813° F. and the mullite melting temperature of approximately 3300° F. Due to the presence of the liquid phase above 2813° F., the mullite crystals will slip and slide resulting in deformation and failure of the refractory shape. Thus, the permissible use temperatures of refractories containing mullite crystals and free silica is limited to a value below 2813° F.

By using pure alumina and potters flint, in the theoretical mullite ratio, as starting materials, and with melting of the mixture in an electric furnace followed by slow cooling to a solidified state, it is possible to produce a solidified mass composed substantially entirely of massive interlocked crystals of pure mullite. Crushed mullite grain or grog produced from the solidified mass can be bonded together readily into desired shapes by various mullite type bonding materials and fired to produce refractory shapes having a permissible use temperature in ordinary furnace wall structures as high as 3250° F., and having excellent spalling resistance.

However, the cost of refractory shapes made from such relatively expensive starting materials has seriously limited their use. To reduce this cost, cheaper starting materials, such as bauxite and kaolin, have been used to produce mullite refractory shapes, but the titania and ferric oxide impurities normally present in bauxite and kaolin reduce the spalling resistance and hot load strength of such refractories. Even when the alumina-silica ratio in the starting bauxite and kaolin mixture is as high as the theoretical mullite ratio, some of the silica present reacts with the impurities to form a glassy phase which detracts from the hot strength and spalling resistance at high temperatures of the refractory shapes.

As a solution to these difficulties and high costs involved in producing mullite type refractories having high use temperatures, there has recently been introduced an all-crystalline mullite refractory produced from a starting mixture of bauxite and kaolin. The starting mixture for the grain or grog and also the synthetic mullite bond, are so proportioned that the alumina percentage is in excess of that required for the theoretical mullite ratio of 72 percent, and may range from 73% to 77% with a preferred percentage of 75. This excess of alumina over the theoretical mullite percentage assures the development of a completely crystalline structure in the presence of the 3-4% of impurities (titania and iron oxide) in the starting materials, and also assures the reaction of all the starting silica with alumina.

In forming the grain or grog, the starting mixture is heated to above the mullite melting temperature, the melt is slowly cooled to effect solidification, and the solid product is crushed to a desired particle size. The grog comprises a completely crystalline structure containing large, well-developed, interlocking mullite crystals, and also crystalline corundum ($Al_2O_3$) due to the excess of alumina.

The bonding material is a relatively fine mixture of pure alumina and kaolin having an alumina-silica ratio sufficiently in excess of the theoretical mullite ratio that, when mixed with the grog, to form a shape, and fired, a completely crystalline bond is produced.

The theory underlying development of this fired refractory shape is that a fired refractory, having a substantially all-crystalline structure and produced from relatively inexpensive starting materials, and particularly one comprising a grog or grain consisting of large well-developed and interlocked mullite crystals with corundum crystals and an all-mullite crystal bond, would have superior properties as compared to mullite type refractories having only a partly crystalline structure or a crystalline structure involving only relatively small mullite crystals. Tests at high temperatures under load have borne out this theory. In such tests, as well as in service applications involving high temperatures, loading and spalling conditions, the aforementioned fired refractory has exhibited high resistance to deformation and spalling. In addition, it has shown excellent spalling resistance as measured by the ASTM panel spalling test, C 122–47.

However, one of the potential large volume applications for this type of high use temperature refractory is in the glass industry for lining continuous glass melting furnaces or tanks. Despite the outstanding physical properties of this refractory shape, it has not found wide spread acceptance in the glass industry as, in some installations it has performed no better than mullite type brick made from kyanite or calcined bauxite, such brick having an alumina content usually in the range of 60 to 70 percent, which is substantially below the required alumina percentage for the theoretical mullite ratio. In other installations, it has performed as well or slightly better than other mullite type refractory but its use has not been economically justified when its cost is compared with that of such other refractories. In still other installations in the glass industry, the subject brick has not performed as well as some less refractory materials.

Investigation indicates that the principal cause for the failure of this substantially all-crystalline refractory to out perform other mullite type refractories appears to be its susceptibility to chemical attack by alkali dust and vapors. Such dust and vapors are natural effluents of the glass manufacturing process wherein large amounts of soda ash or other sodium containing materials are charged into the melting furnace. A certain portion of the alkali is volatilized at the operating temperatures and another portion is swept out of the furnace in dust form. The type of attack on the mentioned all-mullite crystal refractory appears to be one of dry or solid state reaction as opposed to a fluxing or surface melting of a refractory such as would be observed, under the same conditions, with a lining of a fire clay brick having only a 40 to 45 percent alumina content.

The effect of the dry or solid state reaction is the persistent crumbling away of the substantially all-crystalline refractory. While the entire structure appears to be attacked, the greatest damage occurs in the fine grained bonding material. The alkali reacts with the mullite to form compounds of lower specific gravity than that of mullite. As a result, a volume expansion takes place and causes internal cracking in the substantially all-crystalline refractory with a peeling or sloughing off of the exposed surface material.

As the mentioned substantially all-crystalline product is so refractory, it does not tend to flux or form a liquid reaction product on its surface, so that the alkali can enter and react with the structure continuously. Some of the lower alumina content mullite type refractories, such as those produced from kyanite, show a fluxing condition on the exposed surface. However, unless the ambient temperatures are extremely high, this glassy reaction product serves to seal the pores of the structure and retard further alkali penetration. Of course, at very high temperatures, the viscosity of this glass becomes lower, and it tends to run down off the exposed face, taking brick material with it and allowing further reaction to take place. As these lower alumina content mullite type refractories have an appreciable amount of silica glass in their structure to begin with, this serves to protect the mullite crystals from direct attack by alkali. While the size of the mullite crystals in this lower alumina content type of refractory is very small in comparison to the crystal size in the fused mullite grog of the mentioned substantially all-crystalline refractory, such size is comparable to the size of the crystals in the bonding material of the substantially all-crystalline refractory. As there is no glass present in such bonding material, it is readily attacked by the alkalis. The fused mullite aggregate or grog, with its large well developed and interlocked crystals, is quite slow to react with alkali, in comparison to the reaction rate of the alkalis with the bonding material, since the ratio of crystal surface area to weight is much lower in the case of the grog or aggregate.

In accordance with the present invention, it has been found that a fired refractory shape having high temperature service properties equivalent to those of a substantially all-mullite-crystal refractory and yet resistant to such alkali attack can be produced by utilizing a grog or aggregate of fused mullite, with large well-developed interlocked mullite crystals, bonded by a filler material forming a siliceous viscous glass on the initial firing providing protective coverings of envelopes for the mullite grains. The glassy phase of the bonding or filler material must remain viscous and be only slowly reactive with alkalies so that the reaction products tend to remain in place and not drain away to expose more reactive material.

These requirements are fulfilled by using a grog or aggregate of fused mullite comprising from 60-80% by weight alumina and a mullite bonding or filling material comprising from 25-40% by weight alumina. A preferred narrower percentage range of the alumina in the grog is 65-75%, with a preferred alumina content of 75% in the grog. A preferred narrower range of alumina in the bonding or filler material is 30-35%.

The mullite grain or grog is prepared by melting either a domestic bauxite or a mixture of Guiana bauxite and kaolin, with the charge being proportioned to provide an alumina content of from 60-80% and preferably from 73-77%. The melted charge is slowly solidified to provide large, well-developed and interlocked mullite crystals, and is then crushed to the desired size.

The bond is prepared from clay, clay minerals, or mixtures thereof with or without flint so proportioned as to provide an alumina content of 25-40%, preferably 30-35%. Typical raw materials which may be used in the bond or filler are pyrophyllite, kaolin, fire clay, ball clay, potter's flint, and bentonite.

A representative domestic pyrophyllite may have the following percentage composition:

| | |
|---|---|
| $Al_2O_3$ | 17.59 |
| $SiO_2$ | 77.61 |
| $Fe_2O_3$ | 0.11 |
| $TiO_2$ | 0.00 |
| CaO | 0.34 |
| MgO | 0.22 |
| $Na_2O$ | 0.12 |
| $K_2O$ | 0.40 |
| L.O.I. | 3.51 |

A representative domestic kaolin may have the following composition:

| | |
|---|---|
| $Al_2O_3$ | 38.65 |
| $SiO_2$ | 45.53 |
| $Fe_2O_3$ | 0.74 |
| $TiO_2$ | 1.18 |
| CaO | 0.00 |
| MgO | 0.18 |
| $Na_2O$ | 0.04 |
| $K_2O$ | 0.29 |
| L.O.I. | 13.54 |

The preferred proportions of the grog and bonding material are respectively 75-80% grog and 25-20% bonding material. Typical mixes of grog or grain and bond are set forth, in percentages by weight, in the following table:

| | C-1 | C-3 | C-4 | C-11 |
|---|---|---|---|---|
| 4 Mesh Mullite Grain | 78.5 | 78.5 | 78.5 | 78.5 |
| 200 Mesh Pyrophyllite | 10.8 | 8.1 | 5.4 | |
| 200 Mesh Kaolin | 10.7 | 13.4 | 16.1 | 15.7 |
| Potters Flint | | | | 5.8 |

Each of these mixes is augmented by sufficient water so that, when pressed into 9" straights (9" x 4.5" x 2.5") with a unit weight of 9.5 to 9.6 lbs., the moisture content will be from 3.0 to 3.5%. The pressed shapes are then dried and fired.

Refractory shapes of these compositions prepared in the foregoing manner have been tested in comparison with refractory shapes of kaolin fire brick, sintered mullite, and fused mullite grog bonded with crystalline mullite filling material. These tests included comparisons of the density, shrinkage, porosity, permeability and resistance to alkali of the invention shapes and the comparison shapes.

In the alkali penetration tests, the test shapes were fired for periods of one hour in contact with flake lye, at temperatures of 2400° F., 2600° F., and 2800° F. These shapes were then cut and observed with a binocular microscope for the extent of penetration, and reaction zones were noted for any evidence of selective solution of the grog constituents and/or the bonds by the lye.

In these comparative tests, the kaolin fire brick shapes exhibited only mediocre resistance to alkali attacks, the alkali either showing extensive penetration, extensive reaction, or both.

The sintered mullite refractory shapes also exhibited poor resistance to alkali attack, showing extensive alkali penetration and reaction, resulting in rupturing and cracking of the test specimens. In the case of one single exception, a glassy coating was formed which was in sufficient amount to protect the remaining structure from further attack and which appeared to be a function of the bond.

With the exception of test specimens embodying a bond according to the invention, the fused mullite refractory shapes had the least resistance to alkali attack. This poor resistance is believed due to the reaction of the mullite and alumina components with sodium to form reaction products, resulting in volume changes which disrupt the structure exposing new surfaces for further attack and eventually leading to complete structural disintegration. The type of chemical reaction appears to be substantially independent of the physical properties, although the rate of attack is slower in shapes of high density and low permeability.

By contrast, all the refractory shape test specimens embodying the bond of the present invention exhibited excellent resistance to alkali attack, with no reaction or penetration of the lye. This excellent resistance is due to the formation of protective envelopes of siliceous glass around the individual mullite grains during initial firing. Upon subsequent exposure of the shape to alkali, the siliceous glass prevents the alkali from contacting the mullite.

In addition, when repeatedly heated and cooled to temperatures as high as 2900° F., the invention refractory exhibited substantially no change in dimensions and no internal cracking even after 5 cycles. This latter behavior is most unusual, as practially all refractory shapes exhibit internal cracking after 5 such cycles. The explanation for the lack of internal cracking after recycling to high temperatures would appear to be the plastic or semi-plastic nature of the bond.

When alkali-resistant shapes embodying the invention were subjected to hot load tests for 1½ hours per test with a loading of 25 p.s.i. and at respective test temperatures of 2850° F., 2950° F., and 3050° F., the subsidences were, respectively, 0.2%, 0.4% and 0.8%. Despite their excellent alkali-resistance, the refractory shapes of the invention have load and high use temperature properties fully equivalent to those of refractory shapes comprising a fused substantially all mullite and corundum crystal grain with an all mullite crystal bond.

The alumina percentage range of 25–40% in the glassy bond is critical in obtaining a fused mullite crystal grog refractory which is resistant to alkali attack and yet has the same high use temperature properties as the mentioned refractory having an all mullite crystal bond. In support of this criticality, alkali exposure tests have been conducted on a series of refractory shapes each having a crushed grog of fused mullite comprising large, well developed and interlocked crystals of mullite but in which the bonds were varied, as to alumina and silica percentages, over a range from 99% silica to 99% alumina. From these tests, it was determined that the least resistance to alkali attack was exhibited by those shapes with bonds having substantially all alumina.

However, shapes prepared with a pure silica bond had a very glassy reaction but the glass flowed easily and the test specimen was split. When the alumina content of the bond is increased to 20%, the glass coating formed upon exposure to alkali is much more viscous and the test specimen did not split. With 45% alumina in the bond, there was only slight evidence of glass formation and the test speciment expanded somewhat. As the alumina content of the bond was progressively increased, exposure of the test specimens to alkali attack resulted in progressively increasing tendencies to crumbling and expansion, with no evidence of glass formation.

Further testing within the limits of 20% to 45% alumina in the bond has established that the ideal combination of refractoriness equivalent to that of substantially all crystal mullite shapes coupled with high resistance to alkali attack is obtained when the alumina content of the bond is in the range of 25% to 40%, with the best results obtained in the 30% to 35% range of alumina in the bond.

The importance of using a dense fused mullite grog with inherently large mullite crystal development is established by tests made using the preferred bond of the invention with grogs of calcined bauxite, one of which has a chemical composition identical to that of the fused mullite grog and the other of which has 89% alumina with only a trace of mullite. In each case, the test shapes exhibited unusual expansion.

This unusual expansion is believed due to the increased reactivity of the sintered aggregates as compared to that of dense, impervious fused mullite aggregate. The sintered grogs appears capable of absorbing the siliceous glass of the bond and forming mullite with consequent expansion. As the glass is absorbed on the initial firing, there is no protective glass left to resist alkali attack. Also, due to the expansion on initial firing, the structure was excessively porous. This porosity offered more opportunity for alkali penetration.

Summarizing, it may be stated that the principal features of the invention are: (1) the use of a base grog or aggregate of fused mullite with inherently large mullite crystal development, thus affording a dense or impervious macrostructure with a slower reactivity to alkalies; (2) the use of a bond or filler which forms a siliceous viscous glass on initial firing, with this glass forming a protective covering or envelope for the mullite grains; (3) the use of a bond or filler which remains viscous and is only slowly reactive with alkalies so that the reaction products tend to remain in place rather than drain away to expose more material for reaction.

While a specific embodiment of the invention has been shown and described in detail to illustrate the application of the invention principles, it will be understood that the invention may be embodied otherwise without departing from such principles.

What is claimed is:

1. A fired refractory shape formed of a dense impervious fused mullite grog consisting substantially entirely of large well-developed interlocked mullite crystals, with an alumina content of 60 to 80% by weight; and a bonding material consisting of alumina and silica, the alumina constituting from 25 to 40% by weight of the bonding material; the proportions of the grog and bonding material being, respectively, 75–80% and 25–20%.

2. A fired refractory shape, having excellent resistance to alkali attack at elevated temperatures, formed of a dense impervious fused mullite grog consisting substantially entirely of large well-developed interlocked mullite crystals, with an alumina content of 60 to 80% by weight; and a 200 mesh bonding material consisting of alumina and silica, the alumina constituting from 25 to 40% by weight of the bonding material; the proportions of the grog and bonding material being, respectively, 75–80% and 25–20%, and the bonding material, upon firing of the shape, developing a viscous glassy phase enveloping the grains of the grog.

3. A fired refractory shape, having excellent resistance to alkali attack at elevated temperatures, formed of a dense impervious fused mullite grog consisting substantially entirely of large well-developed interlocked mullite crystals, with an alumina content of 73 to 77% by weight; and a bonding material consisting of alumina and silica, the alumina constituting from 25 to 40% by weight of the bonding material; the proportions of the grog and bonding material being, respectively, 75–80% and 25–20%, and the bonding material, upon firing of the shape, developing a viscous glassy phase enveloping the grains of the grog.

4. A fired refractory shape, having excellent resistance to alkali attack at elevated temperatures, formed of a dense impervious fused mullite grog consisting substantially entirely of large well-developed interlocked mullite crystals, with an alumina content of approximately 75% by weight; and a bonding material consisting of alumina and silica, the alumina constituting from 25 to 40% by weight of the bonding material; the proportions of the grog and bonding material being, respectively, 75–80% and 25–20%, and the bonding material, upon firing of the shape, developing a viscous glassy phase enveloping the grains of the grog.

5. A fired refractory shape, having excellent resistance to alkali attack at elevated temperatures, formed of a dense impervious fused mullite grog consisting substantially entirely of large well-developed interlocked mullite crystals, with an alumina content of approximately 75% by weight; and a 200 mesh bonding material consisting of alumina and silica, the alumina constituting from 30 to 35% by weight of the bonding material; the proportions of the grog and bonding material being, respectively, 75–80% and 25–20%, and the bonding material, upon firing of the shape, developing a viscous glassy phase enveloping the grains of the grog.

6. A fired refractory shape as claimed in claim 5 in which said bond comprises substantially equal parts of pyrophyllite and kaolin.

References Cited in the file of this patent
UNITED STATES PATENTS

| | | |
|---|---|---|
| 1,644,244 | Freed | Oct. 4, 1927 |
| 2,051,964 | Norton | Aug. 25, 1936 |
| 2,079,715 | Pole | May 11, 1937 |
| 2,195,949 | Wood | Apr. 2, 1940 |